US 008776781 B2

(12) United States Patent
Meydbray

(10) Patent No.: US 8,776,781 B2
(45) Date of Patent: Jul. 15, 2014

(54) VARIABLE TILT TRACKER FOR PHOTOVOLTAIC ARRAYS

(75) Inventor: Yevgeny Meydbray, San Francisco, CA (US)

(73) Assignee: SunPower Corporation, San Jose, CA (US)

(*) Notice: Subject to any disclaimer, the term of this patent is extended or adjusted under 35 U.S.C. 154(b) by 1503 days.

(21) Appl. No.: 12/182,537

(22) Filed: Jul. 30, 2008

(65) Prior Publication Data
US 2009/0032014 A1 Feb. 5, 2009

Related U.S. Application Data

(60) Provisional application No. 60/962,720, filed on Jul. 31, 2007.

(51) Int. Cl.
H01L 31/00 (2006.01)
F24J 2/54 (2006.01)

(52) U.S. Cl.
USPC ........... 126/608; 126/600; 126/604; 126/425; 126/424; 136/251; 136/246

(58) Field of Classification Search
USPC ................. 126/655, 270, 271, 425, 604, 600; 136/246, 244, 251
See application file for complete search history.

(56) References Cited

U.S. PATENT DOCUMENTS

| 4,022,184 | A | * | 5/1977 | Anderson | 126/573 |
|---|---|---|---|---|---|
| 4,149,523 | A | | 4/1979 | Boy-Marcotte et al. | |
| 4,251,819 | A | * | 2/1981 | Vickland | 343/882 |
| 4,404,465 | A | * | 9/1983 | Miller | 250/203.4 |
| 4,429,178 | A | | 1/1984 | Prideaux et al. | |
| 4,476,853 | A | * | 10/1984 | Arbogast | 126/578 |
| 4,765,309 | A | * | 8/1988 | Legge | 126/601 |
| 4,832,001 | A | * | 5/1989 | Baer | 126/579 |
| 4,930,493 | A | * | 6/1990 | Sallis | 126/600 |
| 5,228,924 | A | | 7/1993 | Barker et al. | |
| D565,505 | S | * | 4/2008 | Shugar et al. | D13/102 |
| 8,101,849 | B2 | * | 1/2012 | Almy et al. | 136/246 |
| 2003/0070705 | A1 | * | 4/2003 | Hayden et al. | 136/251 |
| 2006/0044511 | A1 | * | 3/2006 | Mackamul | 353/3 |

FOREIGN PATENT DOCUMENTS

| AU | 581977 | 3/1989 |
|---|---|---|
| ES | 2294903 | 4/2008 |
| FR | 2461331 | 7/1979 |

(Continued)

OTHER PUBLICATIONS

M/C translation of FR2461331 in English.*

(Continued)

Primary Examiner — Steven B Mcallister
Assistant Examiner — Nikhil Mashruwala
(74) Attorney, Agent, or Firm — Blakely Sokoloff Taylor Zafman LLP

(57) ABSTRACT

A solar tracking system is disclosed. The tracking system includes a tube rotatable around its end-to-end axis. A first support is coupled to the tube at a first location of the tube, and is coupled with a first base. A second support is coupled to the tube at a second location of the tube, and is coupled with a second base. A translation mechanism is coupled with the tube and provided to change the position of the first support relative to the second support.

2 Claims, 5 Drawing Sheets

(56) References Cited

FOREIGN PATENT DOCUMENTS

| | | | |
|---|---|---|---|
| FR | 2461331 A | * | 3/1981 |
| JP | 60169173 | | 9/1985 |
| JP | 61043711 | | 3/1986 |
| JP | 2004-146759 | | 5/2004 |
| JP | 2004-153202 | | 5/2004 |
| WO | WO2004-083741 | | 9/2004 |
| WO | WO-2007/038760 | | 4/2007 |
| WO | WO-2007/128401 | | 11/2007 |

OTHER PUBLICATIONS

M/C translation of FR 2461331 of Gaechter J.P Mar. 1981.*

International Search Report and Written Opinion of the International Searching Authority, PCT/US08/009283 filed Jul. 31, 2008, mailed Feb. 25, 2009.

Shugar, et al., "Design and Prototype of a Minimal Cost Tracking Photovoltaic Structure," Proceedings of the American Solar Energy Society Conference, Jul. 1995, 6 pgs.

First Office Action from Chinese Patent Application No. 200890100001.1 mailed Jul. 8, 2010, 2 pgs.

Second Notification to Make Rectification from Chinese Patent Application No. 200890100001.1 mailed Nov. 15, 2010, 2 pgs.

International Preliminary Report on Patentability, PCT/US2008/009283 filed Jul. 31, 2008, mailed Feb. 11, 2010, 5 pages.

Shingleton, J., "One-Axis Trackers—Improved Reliability, Durability, Performance, and Cost Reduction," Subcontract Report, NREL/SR-520-42769, Feb. 2008, 56 pgs.

* cited by examiner

VARIABLE TILT TRACKER FOR PHOTOVOLTAIC ARRAYS

CROSS REFERENCE TO RELATED APPLICATIONS

This application claims the benefit of U.S. Provisional Application No. 60/962,720, filed Jul. 31, 2007, the entire contents of which are hereby incorporated by reference herein.

TECHNICAL FIELD

Embodiments of the present invention are in the field of solar tracking systems and, in particular, variable tilt trackers for photovoltaic arrays.

BACKGROUND

Photovoltaic cells, commonly known as solar cells, are well known devices for direct conversion of solar radiation into electrical energy. Generally, photovoltaic cells are grouped into arrays or modules of interconnected cells mounted on a common or shared substrate and electrically coupled to an electrical power distribution network. It is desirable to maintain a nearly perpendicular orientation of the array to the Sun's solar rays, thereby maximizing exposure of the photovoltaic cells to direct sunlight and optimizing energy yield. However, since angles of incidence of the solar rays vary according to the time of the day and the season or time of the year, it is generally necessary to provide a tracking system to position or orient the photovoltaic arrays in relation to the Sun.

Conventional tracking systems used to orient or reposition photovoltaic arrays typically move, or more precisely rotate, about a single-axis to follow the arc of the Sun across the sky. However, because the height of the Sun above the horizon changes throughout the year these one- or single-axis tracking systems are not sufficient to accurately track the Sun throughout the day or year.

Alternatively, 2-axis tracking systems have been proposed. However these have either been too complex, and therefore costly, or are insufficiently robust to support the weight of the photovoltaic arrays or to withstand the often harsh environmental conditions to which photovoltaic arrays and their tracking systems are frequently exposed.

DETAILED DESCRIPTION

Figure 1A:
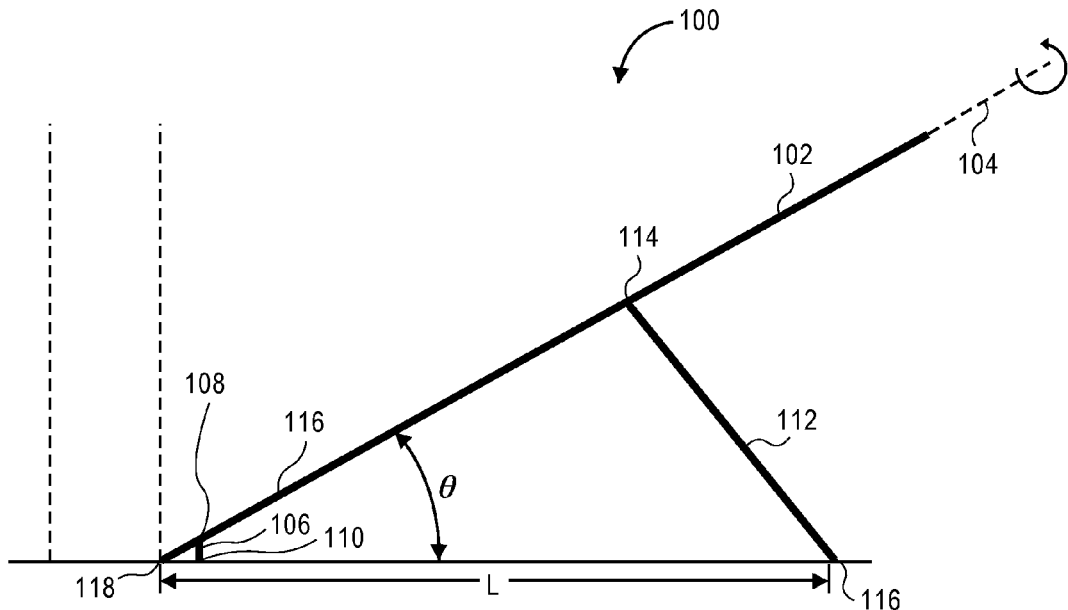
FIG. 1A illustrates a side-on view representing a variable tilt tracker at a first angle for low Sun elevations, in accordance with an embodiment of the present invention.

A tracking system for, e.g., solar tracking is described herein. In the following description, numerous specific details are set forth, such as translation mechanisms, in order to provide a thorough understanding of embodiments of the present invention. It will be apparent to one skilled in the art that embodiments of the present invention may be practiced without these specific details. In other instances, well-known fabrication techniques, such as photovoltaic module fabrication techniques, are not described in detail in order to not unnecessarily obscure embodiments of the present invention. Furthermore, it is to be understood that the various embodiments shown in the Figures are illustrative representations and are not necessarily drawn to scale.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Described herein is a tracking system for, e.g. enabling solar tracking for a mounted photovoltaic array or module. The tracking system may include a tube rotatable around its end-to-end axis. In an embodiment, a first support is coupled to the tube at a first location of the tube, and is coupled with a first base. A second support may be coupled to the tube at a second location of the tube, and may be coupled with a second base. In an embodiment, a translation mechanism is coupled with the tube and provided to change the position of the first support relative to the second support. In one embodiment, the translation mechanism changes the position of the first support relative to the second support by moving the first support from the first location of the tube to a third, different, location of the tube. In another embodiment, the translation mechanism changes the position of the first support relative to the second support by changing the position of the second base relative to the first base.

An inexpensive and robust tracking system capable of moving a photovoltaic array through or about at least two axes to maximize exposure of the photovoltaic cells in the array to direct sunlight, and thus optimizing the energy generated, may be provided. In accordance with an embodiment of the present invention, a solar tracking system is provided to offer greater flexibility in movement and adjustment options than a single-axis tracking system, yet offer less complexity as compared to a classic 2-axes tracking system. The tracking system may be capable of being operated automatically or manually, and in parallel with one or more additional tracking systems to simultaneously reposition multiple photovoltaic arrays or modules within a solar power generating facility.

Thus, in an embodiment, a solar tracking system is provided to support a photovoltaic array. In one embodiment, the tracking system includes an upper support having an elongated support member hingeably secured at a lower end thereof to a base or surface and pivotably secured to an upper end proximal to a first, upper side of the photovoltaic array. A lower support is secured at an upper end proximal to a second, lower side of the photovoltaic array and at a lower end abutting the base or surface, the lower support further including means for changing a length (L) of a distance between the lower end of the upper support and the point at which the lower support abuts the base. The changing of the length may be carried out to alter an angle at which the photovoltaic array is supported above the base. In a specific embodiment, the lower support includes a lower support member secured at an upper end to the second, lower side of the photovoltaic array and at a lower end engaging a worm gear or jack screw rotatably mounted to the base. Rotating the worm gear or jack screw moves a point of engagement of the lower support member to the worm gear or jack screw and alters the angle of the photovoltaic array. Other embodiments are also disclosed.

The present invention is directed to tracking systems, and more particularly to a tracking system capable of moving a photovoltaic array or module through or about at least two axes (i.e. a tracking system of variable tilt) to maximize exposure of photovoltaic cells in the array to direct sunlight, and thus optimize energy yield for the photovoltaic array. A tracking system according to a number of embodiments of the present invention is described with reference to FIGS. 1A through 5.

Figure 1B:
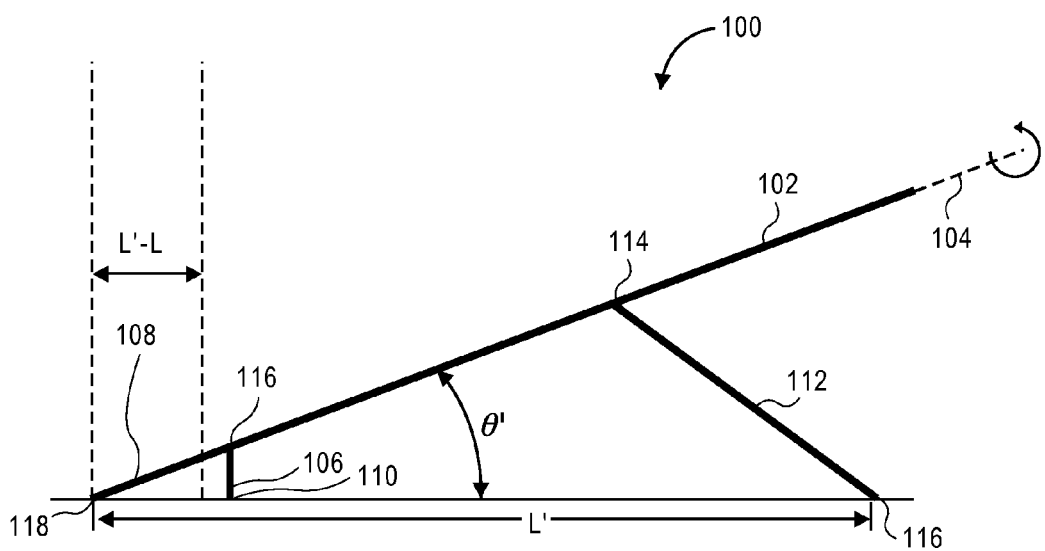
FIG. 1B illustrates a side-on view representing a variable tilt tracker at a second, smaller, angle for higher Sun elevations, in accordance with an embodiment of the present invention.

FIG. 1A illustrates a side-on view representing a variable tilt tracker at a first angle for low Sun elevations, in accordance with an embodiment of the present invention. FIG. 1B illustrates a side-on view representing a variable tilt tracker at a second, smaller, angle for higher Sun elevations, in accordance with an embodiment of the present invention. Referring to FIGS. 1A and 1B, a tracking system 100 includes a tube 102 rotatable around its end-to-end axis 104 (this aspect is shown more clearly in FIG. 2, described below). Referring to FIG. 1A, a first support 106 is coupled to tube 102 at a first location 108 of tube 102, and is coupled with a first base 110. A second support 112 is coupled to tube 102 at a second location 114 of tube 102, and is coupled with a second base 116. A translation mechanism (not shown in FIGS. 1A and 1B, but described in detail with the various embodiments illustrated in FIGS. 2-5) is coupled with tube 102 and is provided to change the position of first support 106 relative to second support 112.

Referring to FIGS. 1A and 1B, in accordance with an embodiment of the present invention, the translation mechanism changes the position of first support 106 relative to second support 112 by moving first support 106 from the first location 108 of tube 102 to a third, different, location 116 of tube 102. In one embodiment, first support 106 is moveably mounted to tube 102 and second support 112 is fixed to tube 102 at the second location 114 of tube 102. That is, although second support 112 may be pivotably mounted to tube 102, in accordance with the embodiment described in association with FIGS. 1A and 1B, the position of second support 112 is fixed at the second location 114 of tube 102. In a specific embodiment, the translation mechanism couples first support 106 to first base 110 and includes or is a device such as, but not limited to, a worm gear or a jack screw, as described in more detail below in association with FIGS. 3A-3C.

Thus, in an aspect of the present invention, referring again to FIGS. 1A and 1B, tracking system 100 includes an upper support 112 having an elongated support member pivotably secured proximal to an upper end or side of tube 102. A lower support 106 is secured proximal to a lower side of tube 102 and abuts a base or surface 110 at a lower end to support tube 102 at an angle (θ) relative to the surface on which bases 110 and 116 are disposed. The elongated support member of second support 112 may be hingeably secured at a lower end to the base or surface 116 to enable second support 112 to move. In an embodiment, first support 106 further includes a mechanism (not shown in FIGS. 1A and 1B) for increasing the length (L) of a distance between the lower end of second support 112, i.e. base 116, and the point 118 at which the lower end of tube 102 abuts an axis created by bases 110 and 116 in order to alter the angle (θ) at which tube 102 is supported. In one embodiment, referring to FIG. 1A, the length (L) is kept relatively short, and hence the angle (θ) is kept relatively large, e.g. greater than 20°, which is a suitable position for maximizing exposure of photovoltaic cells supported by tube 102 to direct sunlight and optimizing energy yield when the elevation of the Sun above the horizon is low, for example, during winter or early or late in the day. In another embodiment, referring to FIG. 1B, the length (L') is kept relatively long, and hence the angle (θ') is kept relatively small, e.g. less than 20°, which is a suitable position for maximizing exposure of photovoltaic cells supported by tube 102 to direct sunlight and optimizing energy yield when the elevation of the Sun above the horizon is relatively high, for example, during summer or in the middle of the day.

Figure 2:
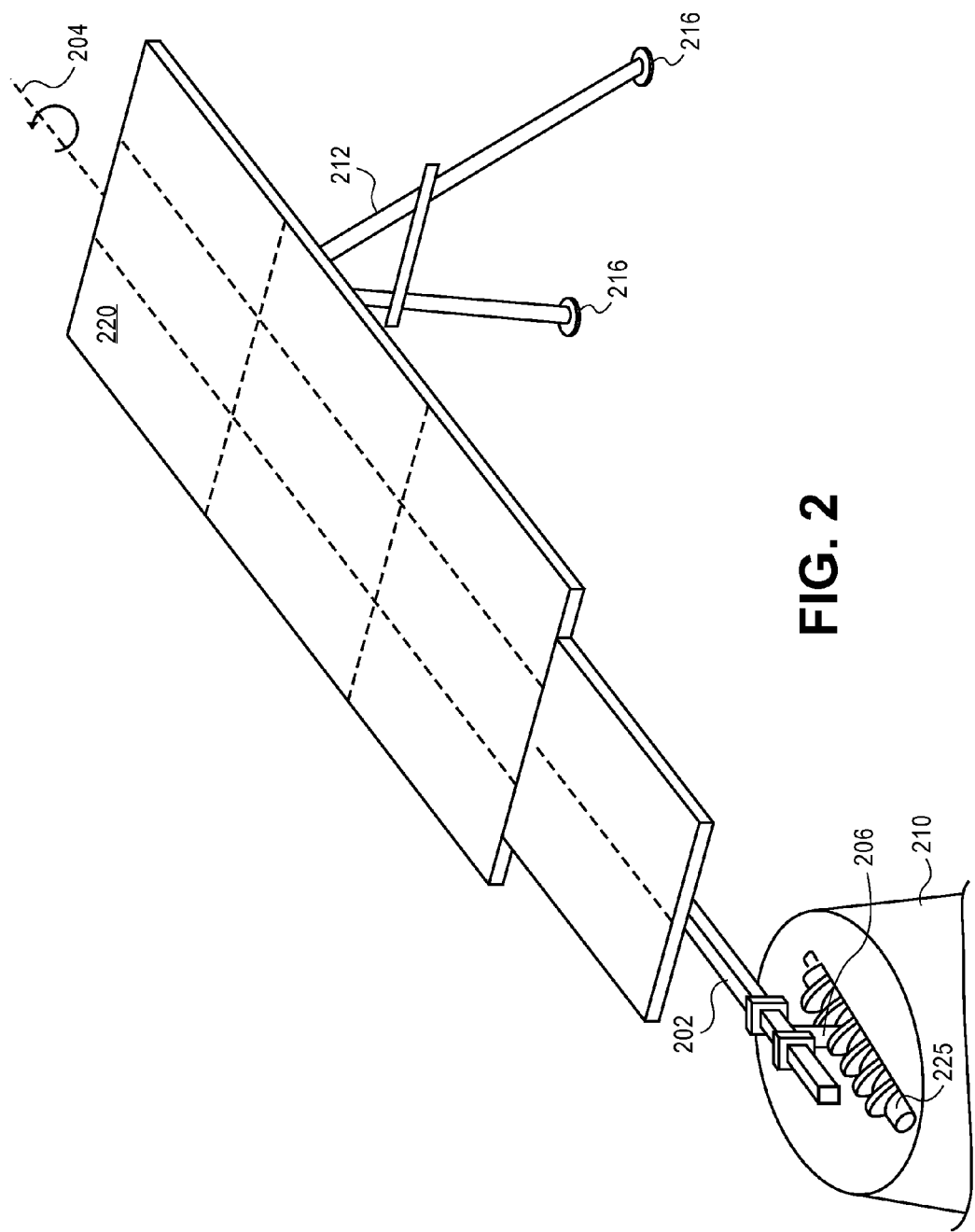
FIG. 2 illustrates a perspective view of a photovoltaic array mounted on a variable tilt tracking system having a translation mechanism provided to change the position of a first support relative to a second support by moving the first support from a first location to another, different, location of a tube, in accordance with an embodiment of the present invention.
Figure 3:
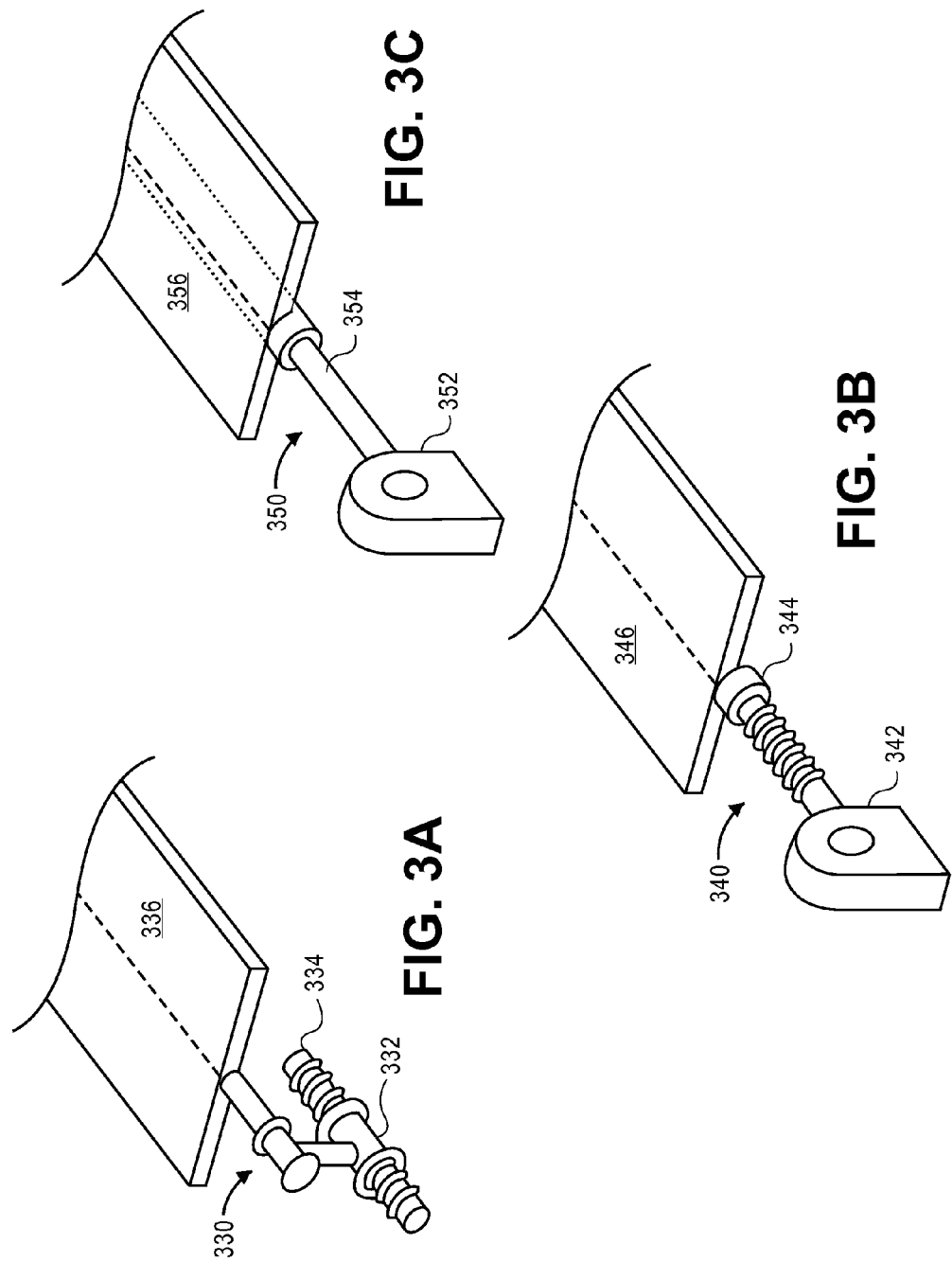
FIG. 3A illustrates a portion of a translation mechanism that includes a threaded collar to engage a worm gear or a jack screw, in accordance with an embodiment of the present invention.
FIG. 3B illustrates a portion of a translation mechanism that includes a worm gear or jack screw threaded into a movable or rotatable collar, in accordance with an embodiment of the present invention.
FIG. 3C illustrates a portion of a translation mechanism that includes a telescoping member, in accordance with an embodiment of the present invention.

In a more detailed view of a tracking system such as tracking system 100, FIG. 2 illustrates a perspective view of a photovoltaic array mounted on a variable tilt tracking system. The tracking system includes a translation mechanism provided to change the position of a first support relative to a second support by moving the first support from a first location another, different, location of a tube, in accordance with an embodiment of the present invention.

Referring to FIG. 2, a tracking system includes a tube 202 rotatable around its end-to-end axis 204. In an embodiment, tube 202 is a rectangular tube. In one embodiment, a photovoltaic module 220 is coupled to a face of the rectangular tube 202, as depicted in FIG. 2. A first support 206 is coupled to tube 202 at a first location, and is coupled with a first base 210. A second support 212 is coupled to tube 202 at a second location, and is coupled with a second base 216. In an embodiment, second support 212 has an A-frame structure and, thus, second base 216 may include two portions, as depicted in FIG. 2. It is noted that the two portions of second base 216 may be coupled to a single foundation or to two separate foundations. A translation mechanism 225 is coupled with tube 202 and is provided to change the position of first support 206 relative to second support 212. In accordance with an embodiment of the present invention, translation mechanism 225 couples first support 206 to first base 210, as depicted in FIG. 2 and as mentioned above in association with FIGS. 1A and 1B. In one embodiment, translation mechanism 225 changes the position of first support 206 relative to second support 212 by moving first support 206 from one location of tube 202 to another, different, location of tube 202.

As depicted in FIG. 2 and as mentioned in association with FIGS. 1A and 1B, translation mechanism 225 may include or may be a device such as, but not limited to, a worm gear or a jack screw. However, versions of a translation mechanism other than the one depicted in FIG. 2 may be used. For example, FIG. 3A illustrates a portion of a translation mechanism 330, coupled with a photovoltaic module 336 that includes a threaded collar 332 which engages a worm gear or a jack screw 334, in accordance with an embodiment of the present invention.

In another example, FIG. 3B illustrates a portion of a translation mechanism 340, coupled with a photovoltaic module 346 that includes a worm gear or jack screw threaded into a movable or rotatable collar, in accordance with an embodiment of the present invention. Referring to FIG. 3B, a support member may itself be or may include a worm gear or jack screw threaded into a movable or rotatable collar 344 on a tube which supports photovoltaic module 346, and hingeably secured at a lower end to an anchor 342 attached to the base or ground (not shown). By changing the length of a distance between anchor 342 and the tube which supports photovoltaic module 346, the angle at which photovoltaic module 346 is supported is altered.

In yet another example, FIG. 3C illustrates a portion of a translation mechanism, 350 coupled with a photovoltaic module 356 that includes a telescoping member, in accordance with an embodiment of the present invention. Referring to FIG. 3C, a support member may include a telescoping member 354 secured at an upper end of a tube which supports photovoltaic module 356 and hingeably secured at a lower end of the tube to an anchor 352. In one embodiment, telescoping member 354 includes a mechanism such as, but not limited to, a hydraulic cylinder or a pneumatic cylinder.

In an aspect of the present invention, a translation mechanism is not limited to a mechanism which changes the position of a first support relative to second support by moving the first support from one location of a tube to another, different, location of the tube. For example, FIG. 4 illustrates a perspective view of a photovoltaic array mounted on a variable tilt tracking system having a translation mechanism provided to change the position of a first support relative to a second support by changing the position of a second base relative to a first base, in accordance with an embodiment of the present invention.

Figure 4:
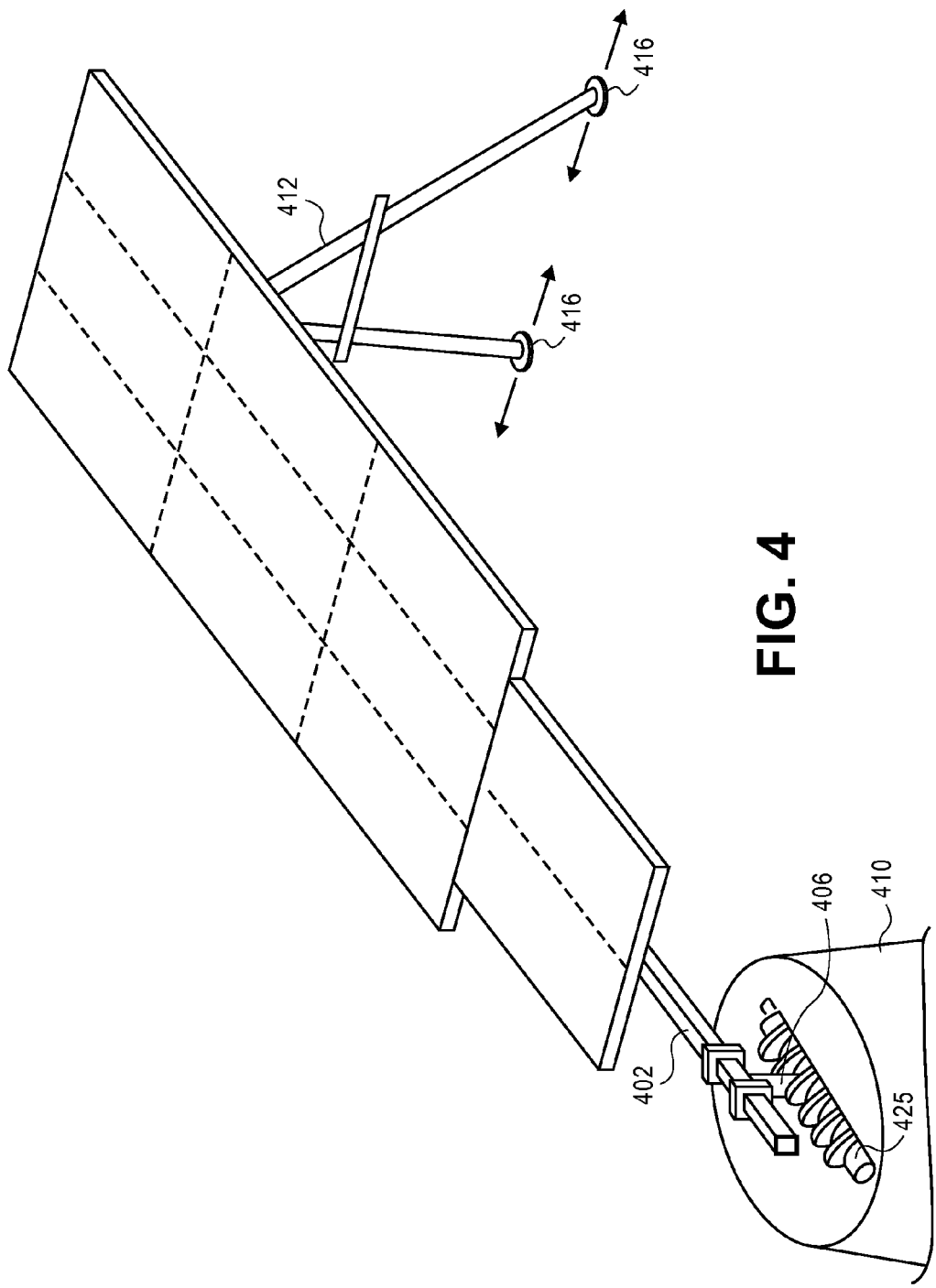
FIG. 4 illustrates a perspective view of a photovoltaic array mounted on a variable tilt tracking system having a translation mechanism provided to change the position of a first support relative to a second support by changing the position of a second base relative to a first base, in accordance with an embodiment of the present invention.

Referring to FIG. 4, a first support 406 is fixed to a tube 402 for supporting a photovoltaic array at a first location of tube 402. A second support 412 is fixed to tube 402 at a second location of tube 402. First support 406 is coupled with a first base 410 and second support 412 is coupled with a second base 416. In accordance with an embodiment of the present invention, second support 412 has an A-frame structure, as depicted in FIG. 4. In an embodiment, a translation mechanism changes the position of first support 406 relative to second support 412 by changing the position of second base 416 relative to first base 410. In one embodiment, the position of second base 416 relative to first base 410 is changed by moving the two portions of base 416 away from one another, in the direction of the outward-facing arrows depicted in FIG. 4. In that embodiment, when the position of second base 416 is changed relative to first base 410, a photovoltaic module mounted to tube 402 is tilted upwards. In another embodiment, the position of second base 416 relative to first base 410 is changed by moving the two portions of base 416 towards one another, in the direction of the inward-facing arrows depicted in FIG. 4. In that embodiment, when the position of second base 416 is changed relative to first base 410, a photovoltaic module mounted to tube 402 is tilted downwards. In an embodiment, first support 406 is fixed to tube 402 at a first location of tube 402 and second support 412 is fixed to tube 402 at a second location of tube 402. That is, although first support 406 and second support 412 may be pivotably mounted to tube 402, the positions of first support 406 and second support 412 are fixed at the first and second locations of tube 402 (note that first base 406 is actually depicted as being moveably mounted to tube 402 in FIG. 4, for ease of description of an alternative embodiment described below). In a specific embodiment, the translation mechanism used to move second base 416 includes or is a device such as, but not limited to, a worm gear or a jack screw.

In another aspect of the present invention, a translation mechanism that changes the position of a first support relative to a second support by changing the position of a second base relative to a first base is not limited to a translation mechanism which moves portions of a second base in the direction of outward- or inward-facing arrows. For example, FIG. 5 illustrates a perspective view of a photovoltaic array mounted on a variable tilt tracking system having a translation mechanism provided to change the position of a first support relative to a second support by changing the position of a second base relative to a first base, in accordance with an embodiment of the present invention.

Figure 5:
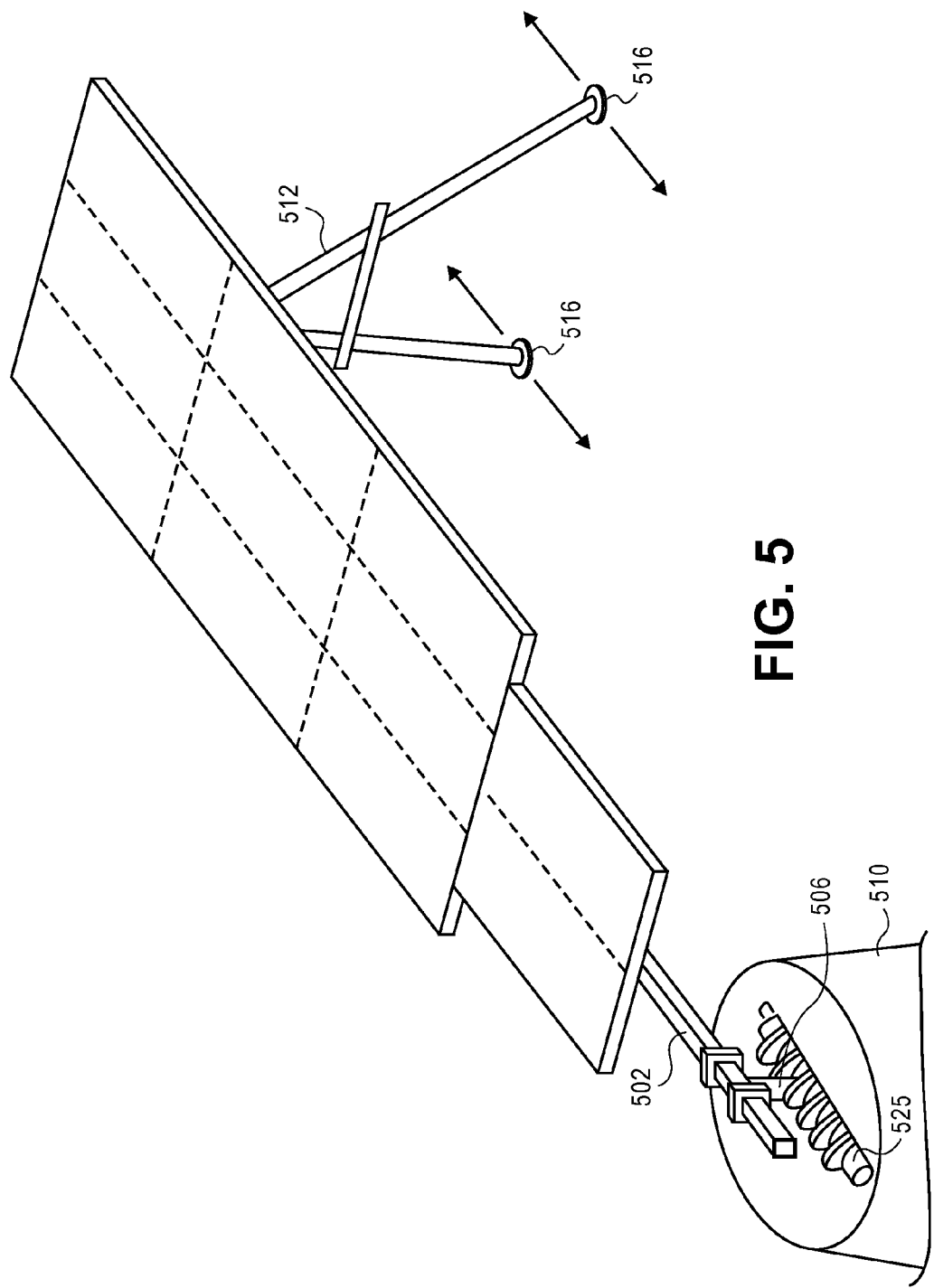
FIG. 5 illustrates a perspective view of a photovoltaic array mounted on a variable tilt tracking system having a translation mechanism provided to change the position of a first support relative to a second support by changing the position of a second base relative to a first base, in accordance with an embodiment of the present invention.

Referring to FIG. 5, a first support 506 is fixed to a tube 502 for supporting a photovoltaic array at a first location of tube 502. A second support 512 is fixed to tube 502 at a second location of tube 502. First support 506 is coupled with a first base 510 and second support 512 is coupled with a second base 516. In accordance with an embodiment of the present invention, second support 512 has an A-frame structure, as depicted in FIG. 5. In an embodiment, a translation mechanism changes the position of first support 506 relative to second support 512 by changing the position of second base 516 relative to first base 510. In one embodiment, the position of second base 516 relative to first base 510 is changed by moving second base 516 in the direction of the backward-facing arrows depicted in FIG. 5. In another embodiment, the position of second base 516 relative to first base 510 is changed by moving second base 516 in the direction of the forward-facing arrows depicted in FIG. 5. Depending on the precise location of second support 512 that is normal (orthogonal) to tube 502, movement along the backward- or the forward-facing arrows will tilt a photovoltaic module mounted to tube 502 either upwards or downwards. In an embodiment, first support 506 is fixed to tube 502 at a first location of tube 502 and second support 512 is fixed to tube 502 at a second location of tube 502. That is, although first support 506 and second support 512 may be pivotably mounted to tube 502, the positions of first support 506 and second support 512 are fixed at the first and second locations of tube 502 (note that first base 506 is actually depicted as being moveably mounted to tube 502 in FIG. 5, for ease of description of an alternative embodiment described below). In a specific embodiment, the translation mechanism used to move second base 516 includes or is a device such as, but not limited to, a worm gear or a jack screw.

The translation mechanisms and methods of operation of the tracking systems described in association with FIG. 2 and with FIGS. 4 and 5 may be combined, in accordance with an embodiment of the present invention. For example, in an embodiment, a translation mechanism changes the position of a first support relative to a second support by moving the first support from one location of a tube to another, different, location of the tube, and by changing the position of the base of the second support relative to the base of the first support. In one embodiment, the first support is moveably mounted to the tube and the second support is fixed to the tube. Example embodiments are depicted by translation mechanisms 425 and 525 from FIGS. 4 and 5, respectively, each showing a moveably mounted first support.

Although not shown, it is to be understood that a tracking system, such as a tracking system described in an embodiment of the present invention, can further include a controller to automatically operate a translation mechanism to change the position of the first support relative to the second support. The controller can be configured or programmed to alter the position based on a calendar or clock to dynamically maximize the power output of a photovoltaic array throughout the course of a year and/or a day. The controller may include a separate photo-detector or may monitor the output of the photovoltaic array. It is also to be understood that the tracking system can still further include a control mechanism to move a photovoltaic array around the end-to-end axis of a tube on which the photovoltaic array rests. For example, in a specific embodiment, a single-axis tracking system such as the SunPower T20 Tracker tracking system available from SunPower Corporation of San Jose, Calif., U.S.A., is modified to include a translation mechanism provided to change the position of a first support relative to a second support of a tube that supports a photovoltaic array. Furthermore, a tracking system of the present invention can be adapted to operate in parallel with one or more additional tracking systems to simultaneously reposition multiple photovoltaic arrays or modules within a solar power generating facility.

Thus, a tracking system has been described. In accordance with an embodiment of the present invention, the tracking system includes a tube rotatable around its end-to-end axis. A first support is coupled to the tube at a first location of the tube, and is coupled with a first base. A second support is coupled to the tube at a second location of the tube, and is coupled with a second base. In an embodiment, a translation mechanism is coupled with the tube and provided to change the position of the first support relative to the second support. In a specific embodiment, the translation mechanism changes the position of the first support relative to the second support by moving the first support from the first location of the tube to a third, different, location of the tube. In another specific embodiment, the translation mechanism changes the position of the first support relative to the second support by changing the position of the second base relative to the first base.

The advantages of a tracking system of the present invention over previous or conventional tracking system may include: (i) an inexpensive and robust tracking system capable of providing a 2-axes-like movement of a photovoltaic array and (ii) a tracking system capable of being operated automatically or manually, and in parallel with one or more additional tracking systems to simultaneously reposition multiple photovoltaic arrays or modules within a solar power generating facility.

The foregoing description of specific embodiments and examples of embodiments of the invention have been presented for the purpose of illustration and description, and although embodiments of the invention have been described and illustrated by certain of the preceding examples, they are not to be construed as being limited thereby. The embodiments are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents. The scope of the present invention is defined by the claims, which includes known equivalents and unforeseeable equivalents at the time of filing of this application.

What is claimed is:

1. A tracking system, comprising:
   a rectangular tube for supporting photovoltaic modules thereon, the rectangular tube rotatable around its end-to-end axis;
   a first support coupled to the tube at a first location of the tube, and coupled with a first base;
   a second support coupled to the tube at a second location of the tube, and coupled with a second base, the second support having an A-frame structure with a maximum height greater than a maximum height of the first support, wherein the rectangular tube extends past the A-frame structure in a direction away from the first support and can support photovoltaic modules past the A-frame structure in the direction away from the first support; and
   a translation mechanism comprising a worm gear or a jack screw within the first support coupled with the tube and provided to change the position of the first support relative to the second support wherein the translation mechanism changes the position of the first support relative to the second support by moving the first support from the first location of the tube to a third, different, location of the tube spaced apart from the first position along the tube's end to end axis.

2. The tracking system of claim 1, wherein the first support is moveably mounted to the tube, and wherein the second support is fixed to the tube at the second location of the tube.

* * * * *